US008851989B2

(12) United States Patent
Rosander et al.

(10) Patent No.: US 8,851,989 B2
(45) Date of Patent: Oct. 7, 2014

(54) METHOD AND APPARATUS FOR HINGING AND HANGING A GAMING MACHINE DOOR

(71) Applicant: IGT, Reno, NV (US)

(72) Inventors: Tai Rosander, Reno, NV (US); Matthew A. Franich, Reno, NV (US)

(73) Assignee: IGT, Las Vegas, NV (US)

( * ) Notice: Subject to any disclaimer, the term of this patent is extended or adjusted under 35 U.S.C. 154(b) by 20 days.

(21) Appl. No.: 13/628,730

(22) Filed: Sep. 27, 2012

(65) Prior Publication Data

US 2014/0087868 A1 Mar. 27, 2014

(51) Int. Cl.
*G06F 17/00* (2006.01)

(52) U.S. Cl.
USPC .............................................................. 463/31

(58) Field of Classification Search
CPC ............................. A63F 13/08; G06F 17/3216
USPC ................................................. 463/31, 46, 47
See application file for complete search history.

(56) References Cited

U.S. PATENT DOCUMENTS

| | | | | |
|---|---|---|---|---|
| 6,550,838 | B2 * | 4/2003 | Bobbitt et al. | 296/52 |
| 2010/0173704 | A1 * | 7/2010 | Cole | 463/30 |
| 2011/0136573 | A1 * | 6/2011 | McComb et al. | 463/31 |
| 2013/0023346 | A1 * | 1/2013 | Greenberg et al. | 463/46 |

* cited by examiner

*Primary Examiner* — Ronald Laneau
(74) *Attorney, Agent, or Firm* — Foley & Lardner LLP

(57) ABSTRACT

A gaming machine includes a cabinet having a compartment for housing circuitry for gaming and a door for closing the compartment. The door is attached to the cabinet by a hinge system. The hinge system includes a first portion attached to a door and a second portion attached to the cabinet. The first portion includes a first pin proximate a first corner of the door, and a second pin further including a round head proximate a second corner of the door. The second pin has a longitudinal axis aligned to the longitudinal axis of the first pin.

14 Claims, 11 Drawing Sheets

METHOD AND APPARATUS FOR HINGING AND HANGING A GAMING MACHINE DOOR

TECHNICAL FIELD

Various embodiments described herein relate to a hinge for a gaming machine door and a method for using the hinge to hang the door on the gaming machine.

BACKGROUND

Electronic and microprocessor based games are becoming increasingly popular. In an electronic gaming machine, a player initiates game play by making a wager. The electronic gaming machine, or microprocessor associated with the electronic gaming machine, determines the result of play and displays it to the game player. A large screen display is provided to display various aspects of the game. Electronic gaming machines display different types of games on a display. The display also provides various aspects of a game to the player, and may be used to entice the player with various games. In some electronic gaming machines, the door includes a display device which makes the door heavy.

Electronic gaming machines are generally tightly packed onto a gaming room floor in a casino. Casinos prefer to have more gaming machines on a floor than less as an increased number of gaming machines generally translates into increased revenue at a casino. When electronic gaming machines are tightly packed, there can be problems with opening doors to gain access to the inner workings of a gaming machine. Basically, a door must only open so far so as to prevent damage to adjacent machines and to allow players to continue play while an adjacent gaming machine is being serviced.

As mentioned above, the door can include a display which makes the door relatively heavy. Like all electronic components, a display may fail in time. When a display fails, the door carrying a display needs to be changed out quickly so as to keep the gaming machine in a revenue generating mode and also to maintain the image of a casino for having all machines up most of the time. It is simply negative marketing to have gaming machines down for any length of time. A casino does not want to get a reputation for having gaming machines out of commission.

It should also be remembered, that the gaming industry, which includes casinos, is a growing, multi-billion dollar, world-wide industry. Large amounts of money can be involved in game play. Individual machines can pay out large amounts. Electronic machines involved in progressive game play, where a large number of players are involved from multiple casinos, can have huge payouts. When such large amounts are at stake, people want to be reassured that any electronic gaming machine will "stay up". Therefore, when a display fails, casinos have a great interest in replacing a display as quickly as possible to maintain the perception of having all the games on the casino floor up a high percentage of time. In some gaming machines, a display is part of a door.

Replacing a door on an existing gaming machine is a time consuming process. Existing gaming machines typically mount the door to the cabinet with a piano hinge. Piano hinges are typically attached using a multitude of screws, each of which takes some time to insert or remove. This makes installation or removal of a heavy door with a built in display connected to the cabinet with a piano hinge at least a two person job. One person needs to hold the heavy door with both hands while the other inserts or removes the screws for the hinge. Depending on the door, more than one installer may have to hold the door.

SUMMARY OF THE DESCRIBED EMBODIMENTS

A gaming machine includes a cabinet having a compartment for housing circuitry for gaming and a door for closing the compartment. The door is attached to the cabinet by a hinge system. The hinge system includes a first portion attached to a door and a second portion attached to the cabinet. The first portion includes a first pin proximate a first corner of the door, and a second pin further including a round head proximate a second corner of the door. The second pin has a longitudinal axis substantially aligned to the longitudinal axis of the first pin. The diameter of the round head is greater than the diameter of the second pin. The second portion, as previously mentioned, is attached to the cabinet, and includes a bushing attached to the cabinet, and a receiver that includes a seat.

The bushing is sized to receive the first pin. The receiver has a slot therein. The slot is larger than the diameter of the second pin. The head of the second pin is sized to fit within the seat of the receiver. The longitudinal axis of the bushing is aligned to the longitudinal axis of the receiver. In one embodiment, the longitudinal axis of the bushing and the receiver is offset from a front surface of the compartment of the cabinet. The receiver, in another embodiment, includes a bracket for holding the receiver at the offset distance from a front surface of the compartment of the cabinet. The bushing can also include a bracket for holding the bushing at the offset distance from a front surface of the compartment of the cabinet.

The first pin, which is dimensioned to fit into the bushing, is tapered to allow the door to be tilted when engaged with the bushing. The tilting of the door allows the second pin to be passed through the slot in the receiver. It also allows the round head to be positioned in the seat of the receiver portion. The hinge system further includes a clip for retaining the second pin within the seat of the receiver. The clip limits the motion of the round head with respect to the seat. The seat wraps around the round head to keep it substantially within the seat. In one embodiment, the clip is rotatably attached to the door so that it can be rotated into a position where it engages the second pin, or more specifically, the narrow portion of the second pin. The clip is attachable to the smaller diameter of the second pin to prevent the round head from being removed from the seat of the receiver.

In one embodiment, the door includes a video monitor. In some embodiments, the video monitor extends substantially across the compartment of the cabinet. The door can also carry other components such as a video display for bonus games or a set of reels. The gaming machine, in some embodiments, includes a door stop which limits the length of travel of the door when opened. The door stop can be a tether that has one end attached to the cabinet and another end attached to the door. In another embodiment, the door stop includes a linkage having a first end attached to the door and having a second end attached to the cabinet of the gaming machine. The door stop functions to keep the door of one gaming machine from opening onto another gaming machine. In casinos or casino environments, gaming machines are placed side by side to maximize the number of gaming machines on a casino floor.

The hinge system of the gaming machine makes changing or hanging a new door more convenient. It also allows for quick changes of the door, which can be important in a casino environment. For example, if the door contains a video monitor which has failed, it is helpful to have a hinge system so the old door can be quickly replaced with a new door having a new monitor.

The method for hanging a new door includes inserting the first tapered pin into the bushing in the cabinet, and tilting the door. The tapered pin guides the pin into place within the bushing. The bushing basically bears most of the weight of the door. The tapered pin also allows the door to be tilted while the pin is within the bushing. An installer can align the second headed pin with the slot in the receiver, and then push the headed pin or round head of the second pin through the slot until the headed pin sits on the seat of the receiver. The tapered pin in the bushing allows for sufficient play to allow this to happen. It should be noted that the installer will have to lift the door slightly to get the headed pin to sit within the seat of the receiver. Once the headed pin is seated in the receiver, the clip is placed onto the headed pin near the receiver. The clip limits the motion of the head of the headed pin with respect to the receiver. The clip prevents the headed pin from leaving the seat of the receiver.

Among the advantages of the present invention is that only one person is needed to swap out a heavy game machine door. Swapping out the door can be done in much less time than swapping out a door connected to the cabinet with an old style piano hinge.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
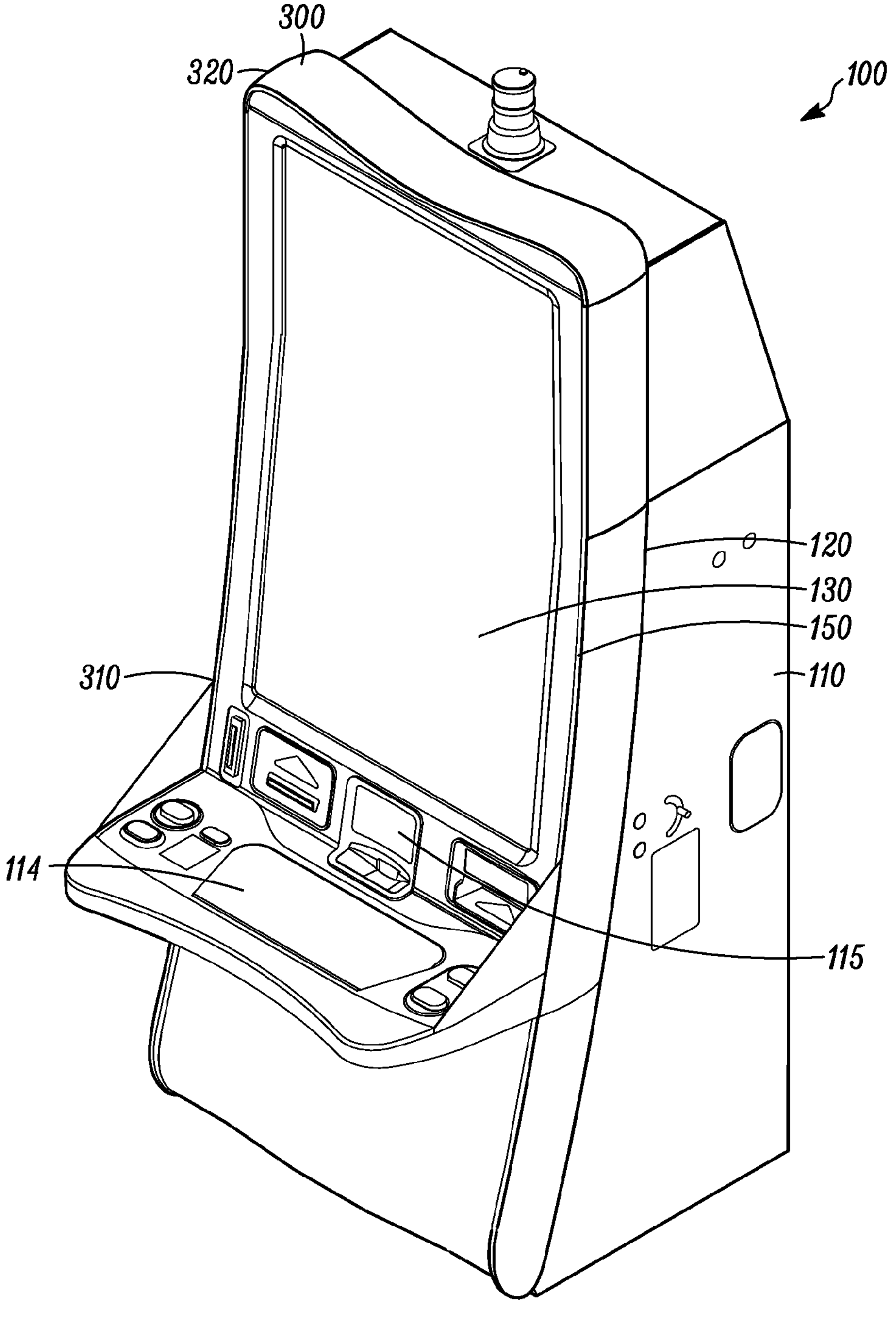
FIG. 1 is a perspective view of an electronic gaming machine apparatus, according to an embodiment of the invention.

FIG. 1 is a perspective of an electronic gaming machine (EGM) 100 that includes a cabinet 110 with a cabinet enclosure or compartment 120 which encloses circuitry for gaming 202 (shown in FIG. 2) and other components. Electronic gaming machine 100 includes a cabinet door 150. The door 150 provides access to the circuitry for gaming 202 which is located in the cabinet enclosure or compartment 120. The door 150 is locked during play to prevent or substantially discourage access to the gaming circuitry 202 and other components within the cabinet enclosure 120 of the housing 110. The housing 110 also includes a specialized keyboard 114, which is also termed a player switch panel. The player switch panel 114 is an input/output device that is communicatively coupled to the circuitry for gaming 202 (shown in FIG. 2) which includes a microprocessor or central processor of the EGM 100. The player input/output or player switch panel 114 is accessible through an outer housing 110 of the EGM 100. Other components are also accessible from the exterior, such as a bill acceptor 115. A monitor 130 is mounted in the cabinet door 150. Other electronics can also be mounted in the door 150, such as a card reader 140, a player tracking display, and a bonusing device. Of course, in other embodiments additional components are or can be attached to the cabinet door 150, such as a second monitor. The door 150, as a result, can be very heavy and difficult to handle. The door 150 is attached to the housing 110 by a hinge system 300. The hinge system 300 includes a first portion 310 and a second portion 320. The first portion 310 includes a lower pin and bushing, and the second portion 320 includes a headed pin and a receiver for the headed pin. The various components of the hinge system 300 will be further detailed below.

Figure 2:
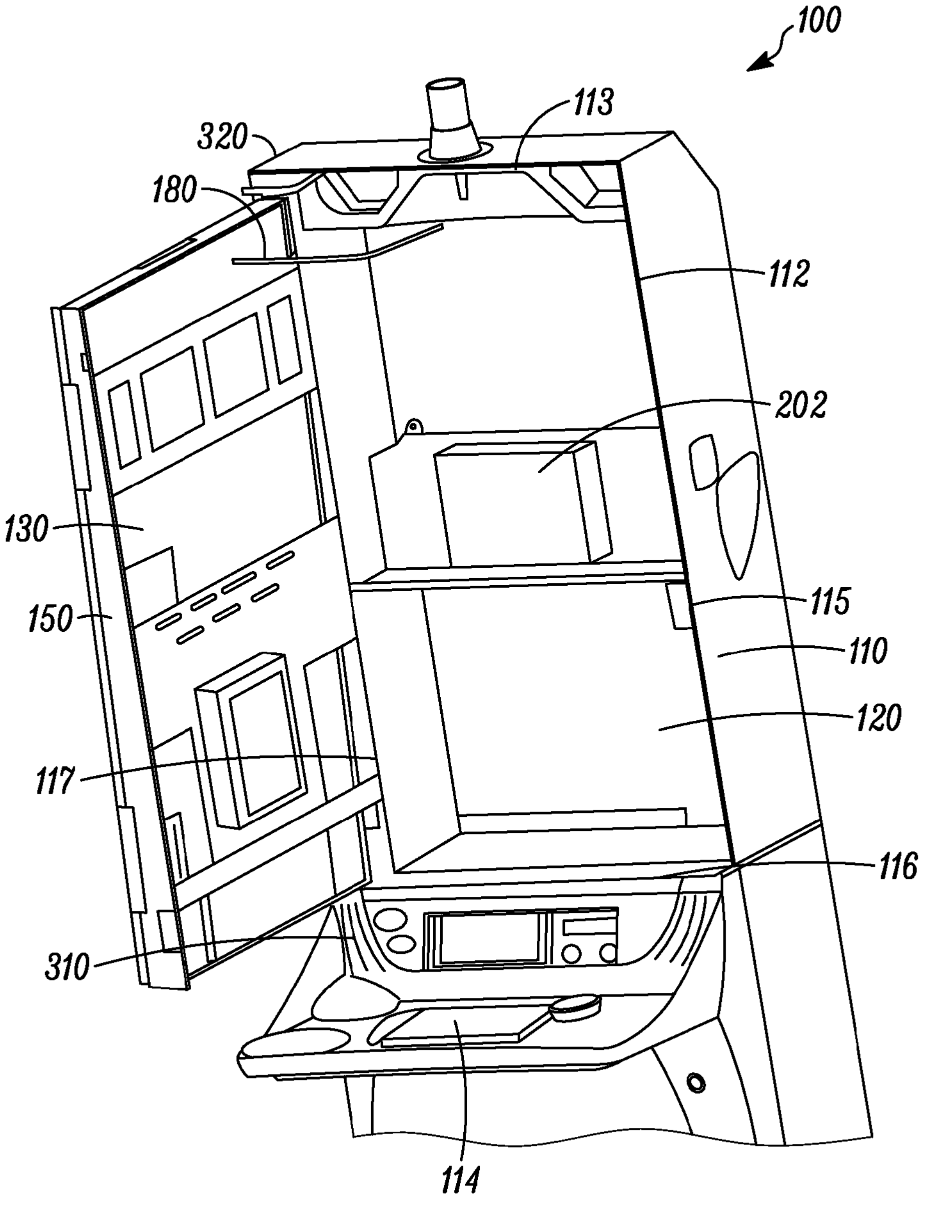
FIG. 2 is a perspective view of an electronic gaming machine apparatus with a door to a compartment of the cabinet in an open position showing the hinge system, according to an example embodiment.

FIG. 2 is a perspective view of the electronic gaming machine (EGM) 100 with a cabinet door 150 open to reveal the cabinet enclosure or compartment 120 and various components therein, according to an example embodiment. The circuitry for gaming 202 includes a brain box that includes the microprocessor, a motherboard and memory. The specialized keyboard 114, which is also termed a player switch panel, is an input/output device that is communicatively coupled to the circuitry for gaming 202 which includes a microprocessor or central processor of the EGM 100. The player input/output or player switch panel 114 is accessible through housing 110 of the EGM 100. The brain box with its microprocessor and memory, the player switch panel 114 and the monitor 130 form a computer system. As shown in FIG. 2, the cabinet or housing 110 has a front face 112. The front face 112 is a plane defined by the edges of the cabinet or housing 110, such as edges 113, 115, 116, 117. Of course two lines define a plane such as the front face 112 so any to the edges 113, 115, 116,

117 can be used to define the front face 112 of the cabinet or housing 110. The door 150 is tethered or attached to the cabinet 110.

As shown in FIG. 2, a two bar linkage 180 is used to limit the motion of the door with respect to the cabinet 110. This is important in some environments such as a casino environment where electronic gaming machines are closely spaced. Limiting the motion of the door 150 with respect to the cabinet 110 prevents the door of one electronic gaming machine from opening onto another electronic gaming machine. It should be noted that any type of tether can be used. For example, a cable could be attached to the cabinet 110 and the door 150 to limit the motion of the door.

Many other computer components are housed within the cabinet or housing 110, such as, a DC communication board assembly, an input/output board, a power supply, and a DC distribution board assembly. Most of these components are associated with a computer system. The cabinet or housing 110 also includes components that are not associated with a computer system. These components can include a bill acceptor assembly, a service lamp, a reset/operator switch, a hopper and other components. Any of the above components may need service from time to time. Therefore, the door 150 and associated hinge system 300 must be operable to allow access to the inside of the cabinet or housing 110. Furthermore since the door 150 carries electronic components, there may be times when it is necessary to change out or replace the door 150. This is very likely in the casino environment where it is desired to keep electronic gaming devices 100 up and ready for play a high percentage of time. As a result, the hinge system 300 must provide for quick and easy replacement of the door 150. A hinge system that would allow for replacement of the door 150 by a single technician would also allow for less maintenance costs associated with the electronic gaming machine 100. The door 150 when populated with the various components can also be heavy so the hinge system 300 must be able to handle the heavy weight of the door 150 as it opens and closes.

Figure 3:
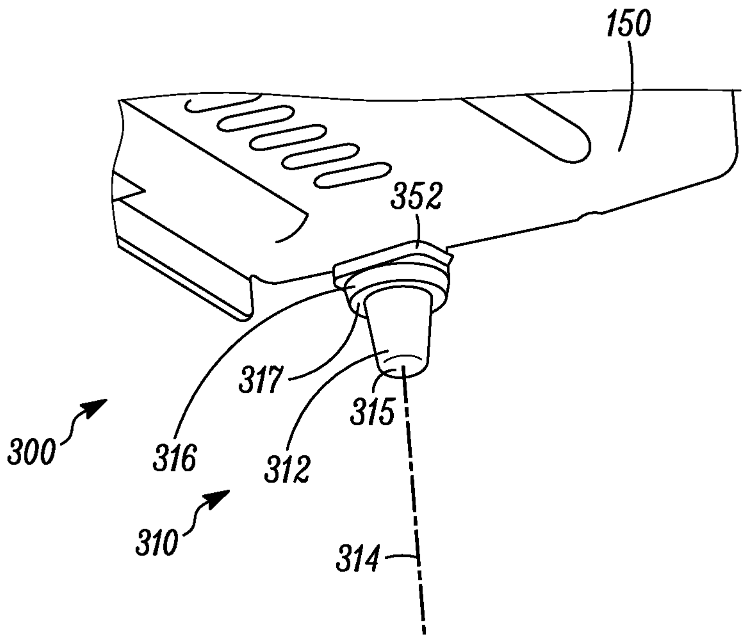
FIG. 3 is a perspective view of the lower pin of the hinge system, according to an example embodiment.
Figure 4:
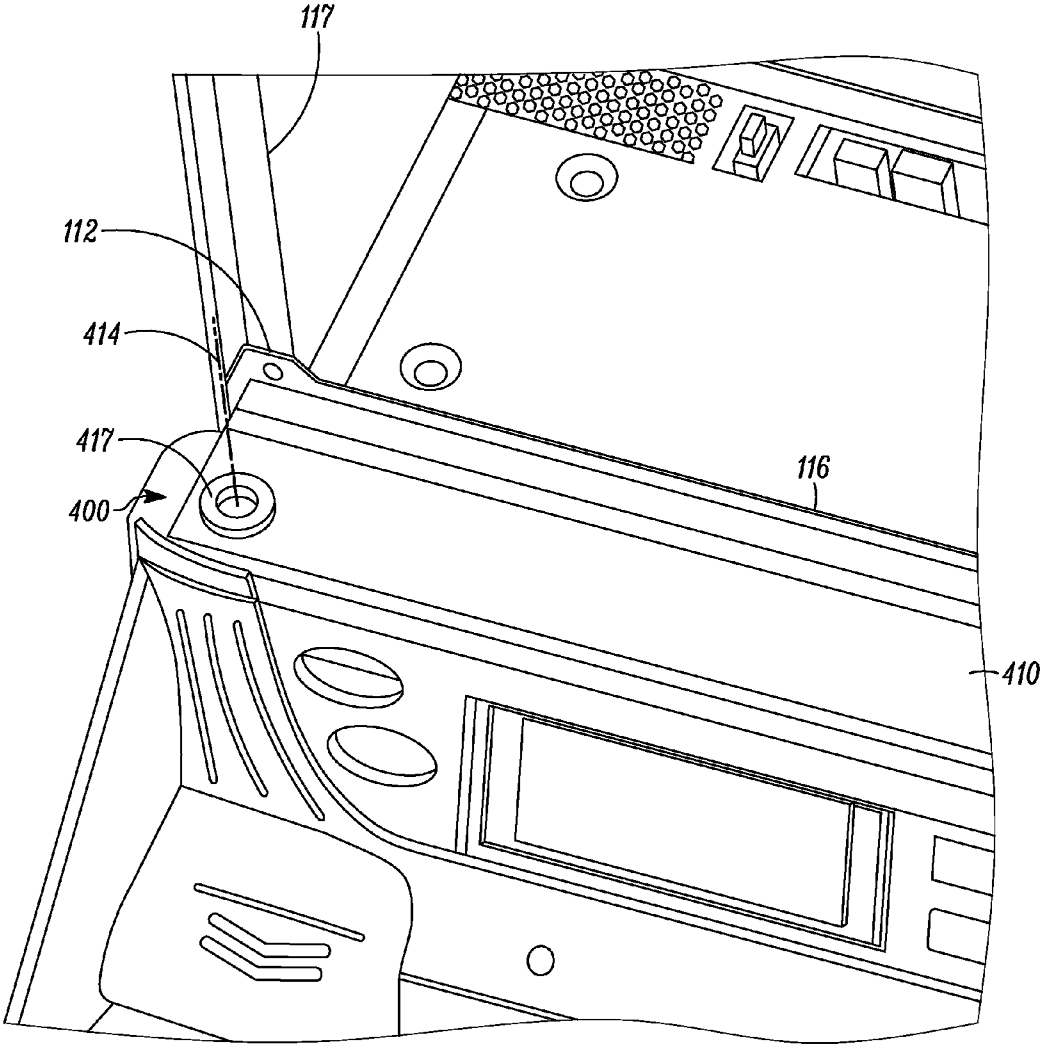
FIG. 4 is a top view of the bushing in a gaming machine cabinet, according to an example embodiment.

A first portion 310 of a hinge system 300 will now be discussed with reference to both FIGS. 3 and 4. FIG. 3 is a perspective view of a lower pin 312 of the hinge system 300, according to an example embodiment. FIG. 4 is a top view of a bushing 400 in a gaming machine cabinet 110, according to an example embodiment. The lower pin 312 is attached to the door 150 at or near a corner of the door 150. The lower pin or first pin 312 has a longitudinal axis 314. The lower pin 312 is tapered along its length and has a rounded tip or end 315. The rounded tip or end 315 and the taper along the length of the pin 312 act as a guide for placing the pin within the bushing 400. The pin 312 also includes an enlarged portion 316 includes a surface 317 for riding on the bushing 400. The pin 312 can be directly attached to the door 150. In another embodiment, the door includes a door frame 350 and the pin 312 is attached to the doorframe 350. The doorframe 350 includes a tab 352 which the pin 312 is attached. The bushing 400 is attached to the cabinet or housing 110. More specifically, the bushing 400 is attached to a ledge 410 associated with the cabinet 110. The bushing 400 is offset from the front face 112 of the cabinet 110. As shown in FIG. 4, the front face 112 is defined by edges 116 and 117. The bushing 400 also includes a longitudinal axis 414. The longitudinal axis 414 is offset from the front face 112, which is defined in part by edges 116 and 117 of the cabinet. The bushing also includes a surface 417 that engages surface 317 when the pin 312 is placed in the bushing 400. The surfaces 317, 417 engage one another when the pin 312 is placed in the bushing 400. The surfaces 317, 417 are smooth so as to provide a smooth and even action when the door 150 is opened with respect to the cabinet 110. The surfaces 317, 417 are also wear surfaces. It should be noted that the tapered portion of the pin 312 allows the pin 312 to be placed in the bushing 400 at various angles, including an angle where the door 150 is slightly tilted with respect to the cabinet or housing 110.

Figure 5:
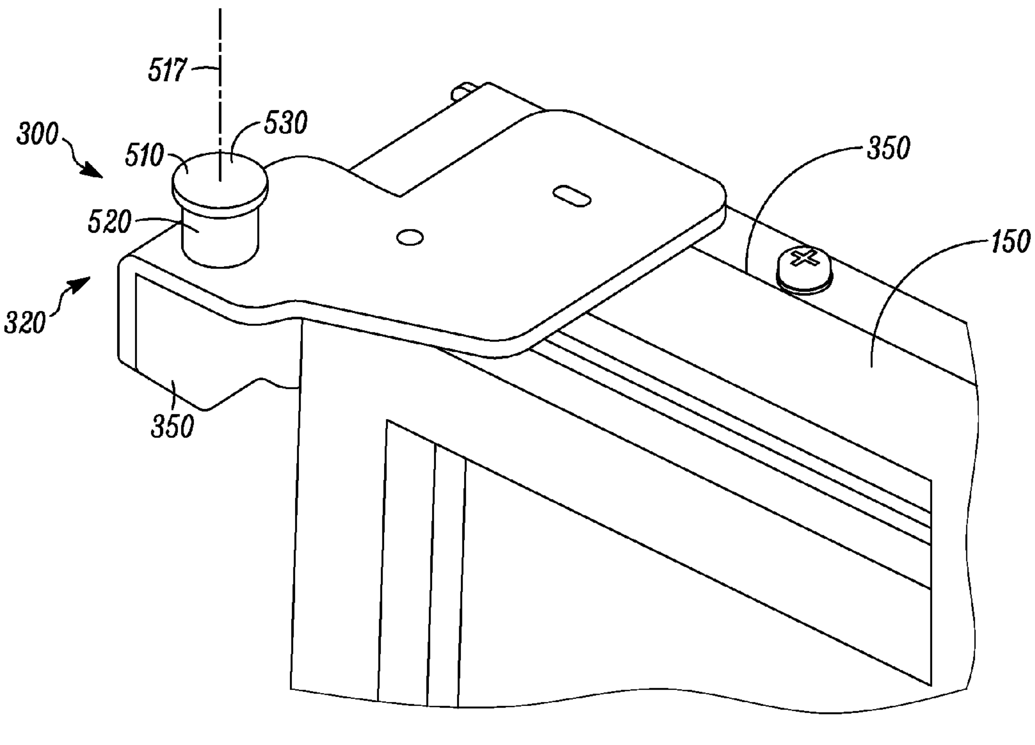
FIG. 5 is a perspective view of a headed pin attached near a corner of a door, according to an example embodiment.

The second portion 320 of the hinge system 300 will now be discussed with respect to FIGS. 5-9. FIG. 5 is a perspective view of a headed pin 510 attached near a corner of a door 150, according to an example embodiment. The headed pin 510 includes a main body 520 and an enlarged head 530. The main body 520 has a diameter which is smaller than the diameter of the enlarged head 530. The enlarged head 530 is round. The headed pin 510 also includes a longitudinal axis 517. The headed pin 510 can also be attached to the doorframe 350 of the door 150. In some instances the doorframe 350 is formed of metal and the components of the door 150 fit within the doorframe 350.

Figure 6:
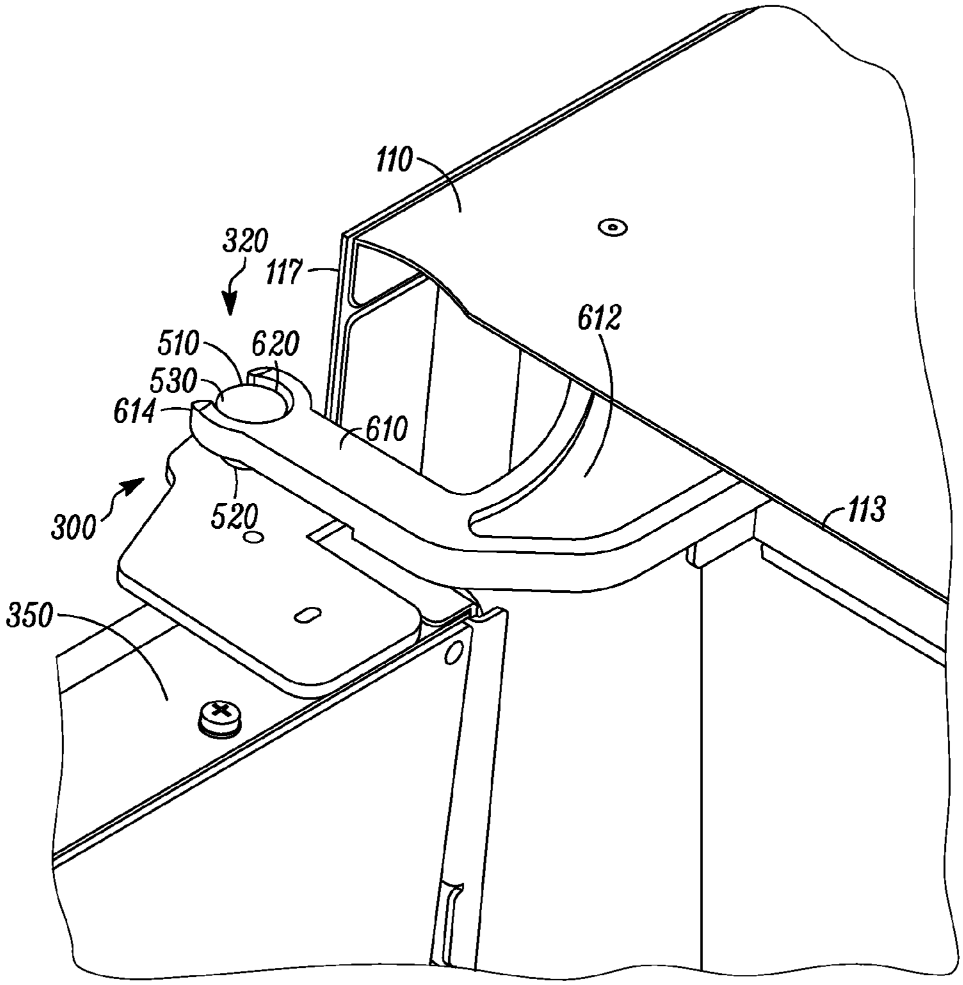
FIG. 6 is a perspective view of the door as installed, according to an example embodiment.

FIG. 6 is a perspective view of the headed pin 510 of door 150 as installed in a receiver 610 of the cabinet or housing 110, according to an example embodiment. The receiver 610 is attached to the cabinet 110. The receiver 610 includes a seat 620. The seat 620 is dimensioned to receive the enlarged head 530 of the headed pin 510. The receiver, as shown in FIG. 6, within J shaped bracket or member 612. The J-shaped bracket holds the seat 620 at an offset distance from the front face of the cabinet or housing 110. The receiver 610 has an open end 614. The open end 614 has an opening that is slightly larger than the diameter of the main body 520 of the headed pin 510. As a result, the main body 520 of the headed pin 510 can be passed through or pushed through the open end 614 of the receiver 610. The open end 614 is also dimensioned to capture the enlarged head 530 of the headed pin 510. As a result, the opening of the open end 614 is smaller than the diameter of the round enlarged head 530. Therefore, the headed pin 510 can be inserted into the receiver 610 by lifting the headed pin 510 slightly so that the main body 520 can pass through the open end 614 and then dropping the enlarged round head 530 into the seat 620 of the receiver 610. The seat 620 of the receiver 610 is sized to receive the enlarged round head 530 of the headed pin 510.

Figure 7:
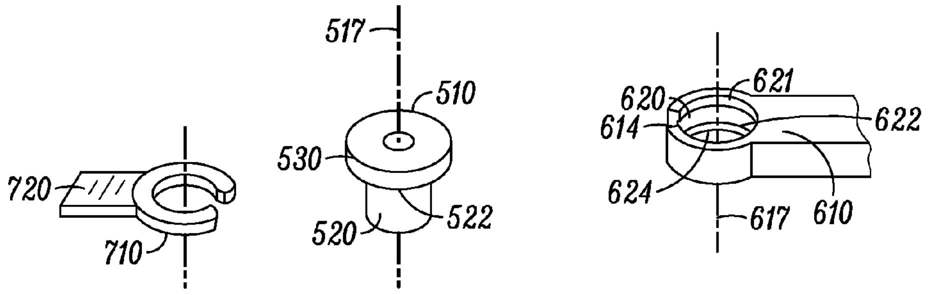
FIG. 7 is a perspective view of the headed pin, the clip, and the seat in the J-shaped portion attached to the cabinet of the gaming machine, according to another example embodiment.

FIG. 7 is a perspective view of the headed pin 510, a clip 710, and the seat 620 in the J-shaped receiver portion 610, according to another example embodiment. As detailed in FIG. 7, the seat 620 is essentially c-shaped with an open end 614 and an open bottom 624. The open bottom 624 is essentially U-shaped. The dimension between the legs of the U is slightly larger than the diameter of the main body 520 of the headed pin 510. The U-shaped opening 624 has a rounded end 625. The diameter of the rounded end 625 is slightly larger than the diameter of the main body 520 of the head and 510. The seat 620 is also circularly shaped and is dimensioned to receive the enlarged round head 530 of the headed pin 510. The seat 620 includes an outer wall 621 and a ledge 622. The ledge 622 is also substantially circular in shape. The ledge 622 provides a wear surface for the headed pin 510. More specifically the ledge 622 abuts a surface 522 on the headed pin 510. The surface 522 is the surface between the main body 520 and the enlarged head 530 of the headed pin. The ledge 622 and the surface 522 are generally smooth to provide a smooth action between the door 150 and the cabinet as the doors being opened or closed. Once the headed pin 510 is engaged or placed into the seat 620, the clip 710 is removably attached to the main body 520 of the headed pin 510. The clip 710 is essentially a C-clip dimensioned to fit the main body 520 of the headed pin 510. The clip 710 includes a finger tab 720. The finger tab 720 allows the clip 710 to be easily installed and removed from the main body 520 of the headed pin 510. The clip 710 limits the motion of the headed pin 510 with respect to the receiver 610. More specifically, the clip 710 limits the motion of the head and with respect to the seat 620 in the receiver 610. Once the headed pin 510 is engaged with the seat 620 gravity will generally keep the headed pin within the receiver 610. As mentioned above, the open end 614 of the receiver retains the enlarged round head 530 of the headed pin 510. The only way the headed pin can be removed from the seat 620 of the receiver 610 is by lifting the headed pin 510 with respect to the seat 620 of the receiver 610. The clip 710 attaches to the main body 520 of the headed pin 510 to limit motion between the headed pin 510 and the seat 620. The clip 710 limits motion parallel to the longitudinal axis 517 of the headed pin 510. It should also be noted that the seat 620 of the receiver 610 also includes a longitudinal axis 617.

Figure 8A:
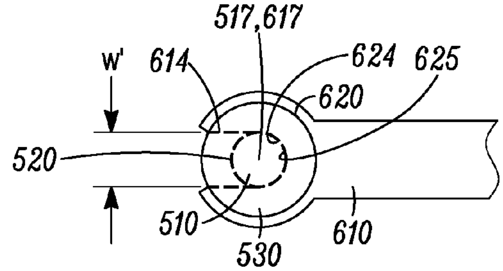
FIG. 8A is a top view of the J-shaped hinge portion with the headed pin inserted therein, according to another example embodiment.

FIG. 8A is a top view of the J-shaped receiver portion 610 with the headed pin 510 inserted therein, according to another example embodiment. For the sake of clarity, there is no clip 710 shown in FIG. 8A. As shown, the enlarged round head 530 is seated within the seat 620 of the receiver 610. The enlarged round head 530 is retained by the receiver 610. The open end 614 has a width or is dimensioned so it is larger than the diameter of the main body 520 of the headed pin 510, yet smaller than the radius of the enlarged round head 530 of the pin 510.

Figure 8B:
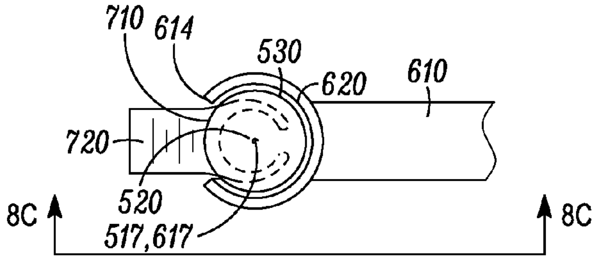
FIG. 8B is a top view of the J-shaped hinge portion with the headed pin inserted into the seat therein, with the clip inserted over the smaller diameter portion of the headed pin, according to another example embodiment.

FIG. 8B is a top view of the J-shaped receiver portion 610 with the headed pin 510 inserted into the seat 620 therein, with the clip 710 inserted over the smaller diameter portion or main body 520 of the headed pin 510, according to another example embodiment. The c-shaped portion of the clip 710 fits over the main body 520 of the headed pin 510 to retain its position within the seat 620 of the receiver 610. The finger tab 720 of the clip 710 includes ridges to provide a grip area for the installation of the clip 710.

Figure 8C:
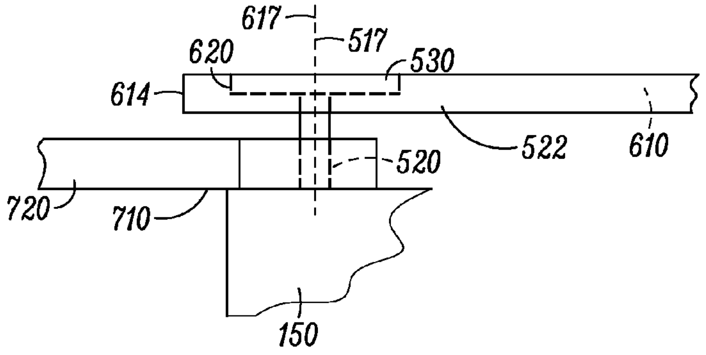
FIG. 8C is a side view of the J-shaped hinge portion with the headed pin inserted into the seat therein, with the clip inserted over the smaller diameter portion of the headed pin, according to another example embodiment.

FIG. 8C is a side view of the receiver portion 610 with the headed pin 510 inserted into the seat 620 therein, with the clip 710 inserted over the smaller diameter portion or main body 520 of the headed pin 510, according to another example embodiment. As shown, the clip 710 is attached to the main body 520 near the receiver 610 of the hinge system 300. This placement limits the movement of the headed pin 510 with respect to the seat 620 of the receiver 610. More specifically, placement of the clip 710 near the seat 620 of the receiver 610 limits the motion of the headed pin 510 in a direction parallel to the longitudinal axis 517 of the headed pin 510 and parallel to the longitudinal axis 617 of the receiver 610 (FIGS. 7, 8A, 8B, and 8C show the longitudinal axes 517, 617). When the electronic gaming machine is in an intended or normal position, the placement of the clip 710 near the seat 620 of the receiver 610 limits the motion of the headed pin 510 in the up and down direction or vertical direction along or parallel to axes 517, 617. Placement of the clip 710 near the seat 620 of the receiver 610 substantially prevents the headed pin 510 from moving out of the seat 620. It should be noted, in FIGS. 8A, 8B, 8C the longitudinal axis 517 of the headed pin 510 and the longitudinal axis 617 of the receiver 610 are substantially aligned. Thus, when the headed pin 510 is seated in the seat 620 of the receiver 610, the longitudinal axes 617, 517 of the receiver and headed pin, respectively, are substantially aligned.

Figure 9:
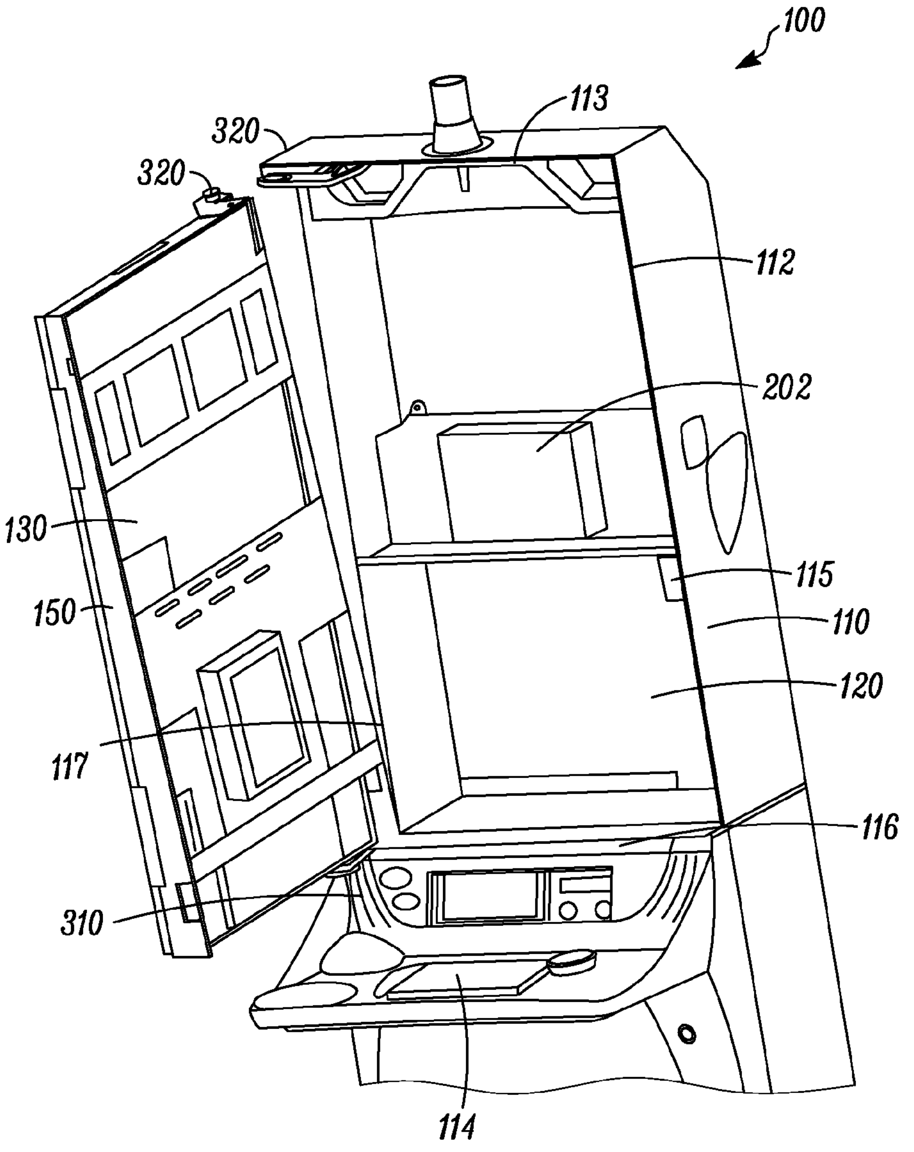
FIG. 9 is a perspective view of the door being installed after the tapered pin has been installed into the bushing and the headed pin is about to be placed into the seat, according to an example embodiment.

FIG. 9 is a perspective view of the door 150 being installed after the tapered pin 312 has been installed into the bushing 400 and the headed pin 510 is about to be placed into the seat 620 of the receiver 610, according to an example embodiment. As shown, the door 150 is slightly tilted with respect to the front face 112 of the cabinet or housing 110. The tapered pin 312 allows for this tilting action. The tilting action is important in that it allows an appropriate amount of play so that the headed pin 510 can be installed within the seat 620 of the receiver 610. The ability to tilt the door 150 also makes changing or hanging a new door more convenient. A person changing the door 150 can place the tapered pin 312 into the bushing 400 which is attached to the ledge 410 associated with the cabinet 110. After this is complete, the ledge 410 and attached bushing 400 carry a majority of the weight of the door 150. Thus, a person changing the door does not have to carry the entire load of the door 150 while trying to align it with a bottom hinge and a top hinge. Once tapered pin 312 of the door 150 is placed in the bushing 400, the operator has to guide the door to a position where the pin 510 is aligned with the receiver 610. Once so aligned, the door 150 is lifted slightly for a moment just enough so that the head 530 of the pin 510 is placed within the seat 620 of the receiver 610.

The hinge system 300 of the gaming machine 100 makes changing or hanging a new door 150 more convenient as the person changing the door does not have to also lift a heavy door during the entire procedure. Having a hinge system 300 that allows for quick changes of a door 150 is important in some environments, such as a casino environment. For example, if the door 150 contains a video monitor 130 which has failed, it is helpful to have such hardware so the old door 150 can be replaced with a new door 150 having a new monitor 130.

Figure 10:
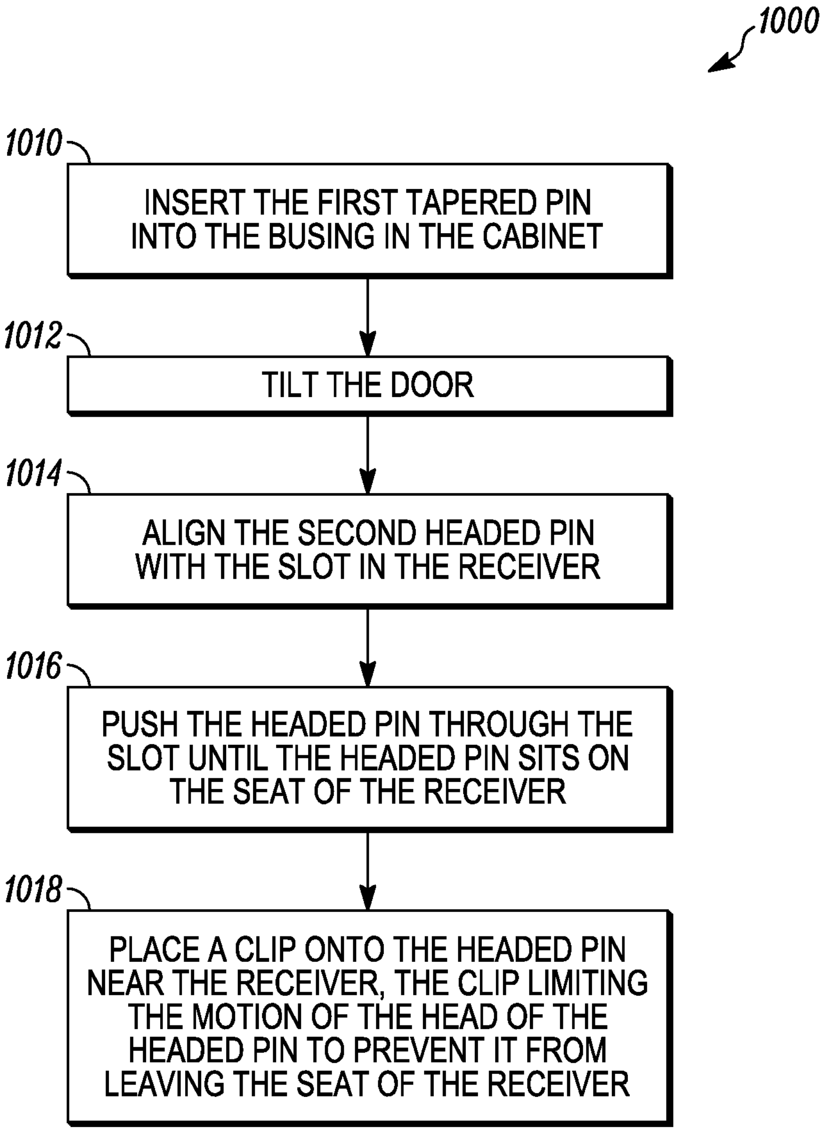
FIG. 10 is a flow diagram of a method for installing a new door, according to an example embodiment.

FIG. 10 is a flow diagram of a method 1000 for installing a new door, according to an example embodiment. The method 1000 for hanging a new door includes inserting the first tapered pin into the bushing in the cabinet 1010, and tilting the door 1012. The tapered pin guides the pin into place within the bushing. The bushing basically bears most of the weight of the door. The tapered pin also limits the motion of the door with respect to the cabinet. The tapered pin also allows the door to be tilted while the pin is within the bushing. While tilted, an installer can align the second headed pin with the slot in the receiver 1014, and then push the headed pin or round head of the second pin through the slot until the headed pin sits on the seat of the receiver 1016. The tapered pin in the bushing allows for sufficient play to allow this to happen. It should be noted that the installer may have to lift the door slightly to get the headed pin to sit within the seat of the receiver. The tapered pin has a length so that it stays engaged with the bushing in the housing as the door is slightly lifted and tilted and the headed pin is placed into the seat of the receiver. Once the headed pin is seated in the receiver, the clip is placed onto the headed pin near the receiver 1018. The clip limits the motion of the head of the headed pin with respect to the receiver. As mentioned previously, the clip prevents the headed pin from leaving the seat of the receiver. The end result of the method 1000, is that the door 150 is installed as shown in FIGS. 1, 2 and 6.

Figure 11:
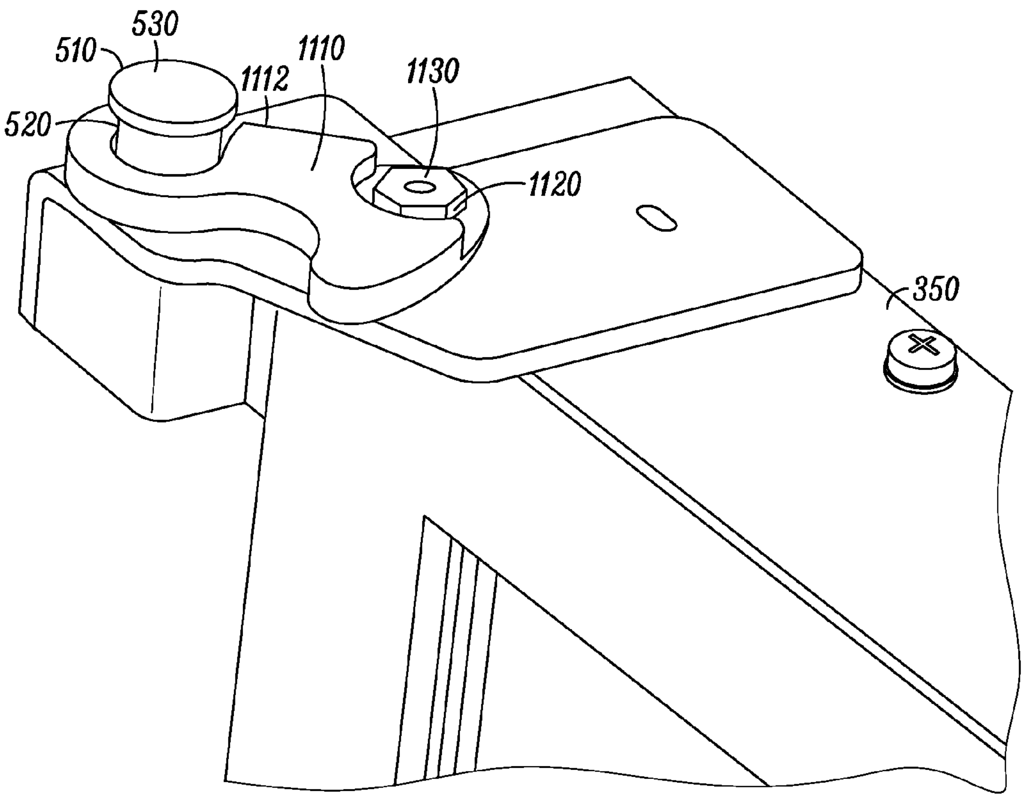
FIG. 11 is a perspective view of a headed pin and a rotatably attached clip attached near a corner of a door, according to an example embodiment.

FIG. 11 is a perspective view of a headed pin 510 and a rotatably attached clip 1110 attached near a corner of a door 150, according to another example embodiment. The clip 1110 includes a C-shaped end which is dimensioned to removably attach to the main body 520 of the headed pin 510. The clip 1110 also includes an opening 1120. A fastener 1130 passes through the opening 1120 in the clip 1110 to rotatably attach the clip 1110 to the door 150 or the door frame 350. By attaching the clip 1110 directly to the door or door frame, there is one less part for an installer to be concerned with. In other words, in the embodiment shown in FIGS. 7, 8A, and 8C, the installer has to carry and keep track of a separate clip 710. In this embodiment, the clip is rotatably attached to the door. When the door is installed, the installer merely rotates the clip 1110 from a disengaged position to an engaged position. The installer does not have to find a separate clip 710 in his toolbox, pocket, or other container since the clip is carried with the door.

Figure 12:
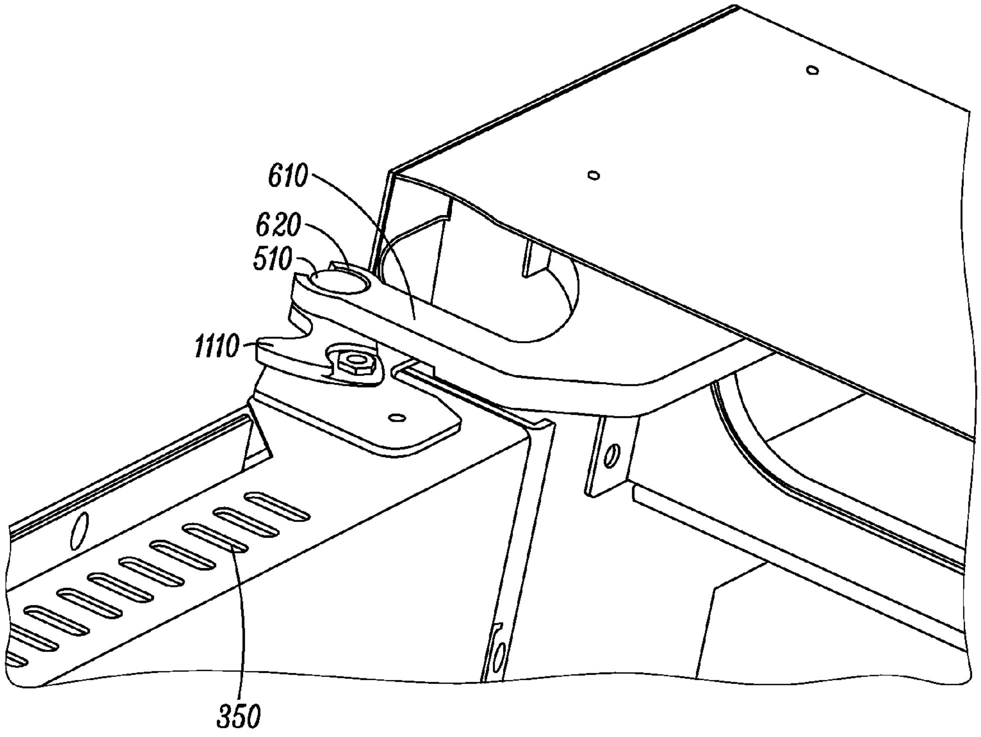
FIG. 12 is a perspective view of the door of FIG. 10 as installed, according to an example embodiment.

Installation of the door 150 includes seating the headed pin 510 into the seat 620 of the receiver 610. The clip 1110 is moved to an open position clear of the headed pin 510 and then the headed pin 510 is placed into the seat 620. Once that is accomplished the clip 1110 can be rotated into place to limit the motion of the headed pin 510 respect to the receiver 620. FIG. 12 is a perspective view of the door 150 as installed on the receiver 610 with the clip 1110 rotated to a position where the c-shaped portion 1112 is attached to the main body 520 of the headed pin 510, according to an example embodiment.

A door 150 for a gaming machine includes a frame 350, a first pin 312 proximate a first corner of the frame 350, and a second pin 510 proximate a second corner of the frame. The second pin 510 further includes a round head 530. The second pin 510 has a longitudinal axis 517 aligned to the longitudinal axis 317 of the first pin 312. The diameter of the round head 530 is greater than the diameter of the body 520 of the second pin 510. A clip 710, 1110 is positioned near the second pin 510. In one embodiment, the clip 1110 is rotatably attached to the door frame 350. The clip 710, 1110 is dimensioned to removably attach to the second pin 510. In one embodiment, the clip is movable between a retain position where the clip is attached to the body 520 of the second pin 510 and an open position where the clip is not attached to the second pin 510. The clip 710, 1110, when attached to the second pin 510, is attached between the ends of the second pin. More specifically, when the clip 710, 1110 is attached to the second pin 510, the clip 710, 1110 is attached near the end of the second pin 510 having the round head 530. In still another embodiment, the frame 350 for the door 150 is sized to receive a video display 130. The frame 350, in some embodiments, also houses at least some other electronics associated with the gaming machine 100.

A gaming machine 100, includes a cabinet 110 having a compartment 120 for housing circuitry for gaming 202. The compartment 120 has a front face portion 112. The cabinet 110 includes a bushing 400 attached to the cabinet 110. The bushing 400 is sized to receive a pin 312. The bushing 400 includes a longitudinal axis 417. The cabinet 110 also includes a receiver 610. The receiver 610 has a round seat 620 therein. The round seat 620 has a longitudinal axis 617. The receiver 610 is attached to the cabinet 110 so that the longitudinal axis 417 of the bushing 400 aligns with the longitudinal axis 617 of the receiver 610. The bushing 400 is attached near one corner of the compartment 120 and the receiver 610 attached near another corner of the compartment 120. In one embodiment, the bushing 400 attached near one corner of the compartment 120 is offset a distance from the front face 112 of the compartment. The receiver 610 is attached near another corner of the compartment 120 and is also offset a distance from the front face 112 of the compartment. The receiver 610 includes, in one embodiment, includes a bracket 612 having a first end attached to the cabinet 110 and a second end offset from the front face 112 of the cabinet. The receiver 610 is attached near a corner of the compartment 120. The bracket 612 is cantilevered off the cabinet. The offset can be achieved by shaping the bracket 612. In one embodiment, the bracket 612 is j-shaped, and in another embodiment, the bracket is triangularly shaped.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed:

1. A gaming machine, comprising:

a cabinet having a compartment for housing circuitry for gaming;

a door for closing the compartment, the door attached to the cabinet by a hinge system which further comprises:

a first portion attached to a door including:

a first pin proximate a first corner of the door; and a second pin further including a round head proximate a second corner of the door, the second pin having a longitudinal axis aligned to the longitudinal axis of the first pin, the diameter of the round head greater than the diameter of the second pin; and a second portion attached to the cabinet, the second portion including:

a bushing attached to the cabinet, the bushing sized to receive the first pin; and a receiver that includes a seat, the receiver having a slot therein larger than the diameter of the second pin, the head of the second pin sized to fit within the seat of the receiver, the bushing having a longitudinal axis aligned to a longitudinal axis of the receiver.

2. The gaming machine of claim 1, wherein the longitudinal axis of the bushing and the receiver is offset from a front surface of the compartment of the cabinet.

3. The gaming machine of claim 1, wherein the receiver includes a bracket for holding the receiver at an offset distance from a front surface of the compartment of the cabinet.

4. The gaming machine of claim 3, wherein the bushing includes a bracket for holding the bushing at the offset distance from a front surface of the compartment of the cabinet.

5. The gaming machine of claim 1, wherein the first pin is tapered to allow the door to be tilted when engaged with the bushing, so that the second pin can be passed through the slot in the receiver to a position where the round head sits in the seat of the receiver portion.

6. The gaming machine of claim 1 further comprising a clip for retaining the second pin within the seat of the receiver.

7. The gaming machine of claim 6 wherein the clip is rotatably attached to the door.

8. The gaming machine of claim 1 further comprising a clip attachable to the diameter of the second pin to prevent the round head from being removed from the seat of the receiver.

9. The gaming machine of claim 1, wherein the door includes a video monitor.

10. The gaming machine of claim 1, wherein the door includes a video monitor, the video monitor extending substantially across the compartment of the cabinet.

11. The gaming machine of claim 1, further comprising a door stop to limit the length of travel of the door when opened.

12. The gaming machine of claim 11, wherein the door stop is a tether having a first end attached to the door and having a second end attached to the cabinet of the gaming machine.

13. The gaming machine of claim 12, wherein the door stop includes a linkage having a first end attached to the door and having a second end attached to the cabinet of the gaming machine.

14. A method of installing a door onto a cabinet of a gaming machine, the door and the cabinet having a hinge system having a first portion attached to a door, the first portion having a first tapered pin proximate a first corner of the door; and a second headed pin proximate a second corner of the door; and a second portion attached to the cabinet, the second portion including a bushing attached to the cabinet, the bushing sized to receive the first pin, and a receiver that includes a seat, the receiver having a slot therein larger than the diameter of the second headed pin, the head of the second pin sized to fit within the seat of the receiver, the method comprising:

inserting the first tapered pin into the bushing in the cabinet;

tilting the door;

aligning the second headed pin with the slot in the receiver;

pushing the headed pin through the slot until the headed pin sits on the seat of the receiver; and placing a clip onto the headed pin near the receiver, the clip limiting the motion of the head of the headed pin to prevent the head from leaving the seat of the receiver.

* * * * *

UNITED STATES PATENT AND TRADEMARK OFFICE

CERTIFICATE OF CORRECTION

PATENT NO. : 8,851,989 B2
APPLICATION NO. : 13/628730
DATED : October 7, 2014
INVENTOR(S) : Tai Rosander et al.

It is certified that error appears in the above-identified patent and that said Letters Patent is hereby corrected as shown below:

IN THE CLAIMS

In Claim 1, Column 10, Line 27, after ";" insert --and--.
In Claim 1, Column 10, Line 30, replace the second instance of "a" with --the--.
In Claim 1, Column 10, Line 34, replace "the" with --a--.
In Claim 1, Column 10, Line 35, replace the second instance of "the" with --a--.
In Claim 1, Column 10, Line 36, replace the first instance of "the" with --a--.
In Claim 4, Column 10, Line 55, replace "a" with --the--.
In Claim 5, Column 10, Line 60, delete "portion".
In Claim 14, Column 11, Line 17, replace the second instance of "a" with --the--.
In Claim 14, Column 12, Line 4, between "first" and "pin" insert --tapered--.
In Claim 14, Column 12, Line 5, replace the second instance of "the" with --a--.
In Claim 14, Column 12, Line 6, between the second instance of "second" and the second instance of "pin" insert --headed--.
In Claim 14, Column 12, Line 12, between the third instance of "the" and the second instance of "headed" insert --second--.
In Claim 14, Column 12, Line 14, between the first instance of "the" and "headed" insert --second--.
In Claim 14, Column 12, Line 15, between the third instance of "the" and "headed" insert --second--.

Signed and Sealed this
Tenth Day of November, 2015

Michelle K. Lee

Michelle K. Lee
*Director of the United States Patent and Trademark Office*